United States Patent Office 3,304,986
Patented Feb. 21, 1967

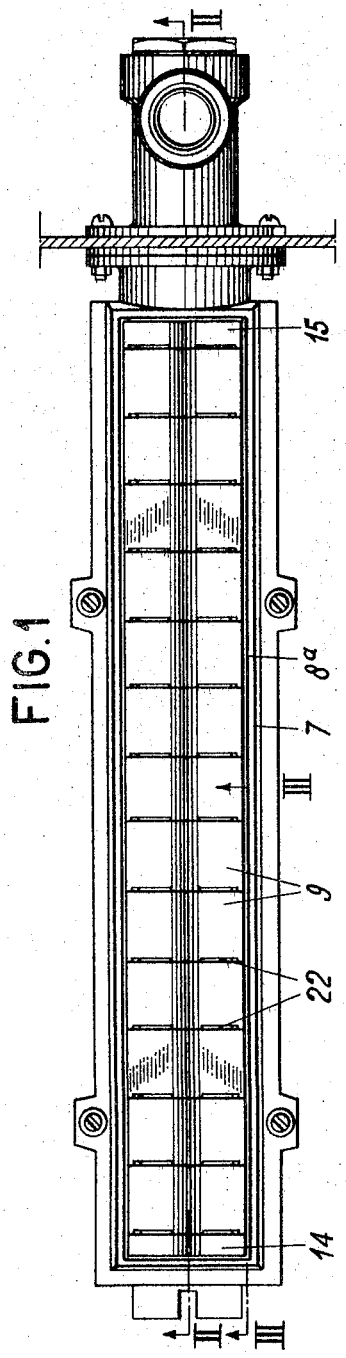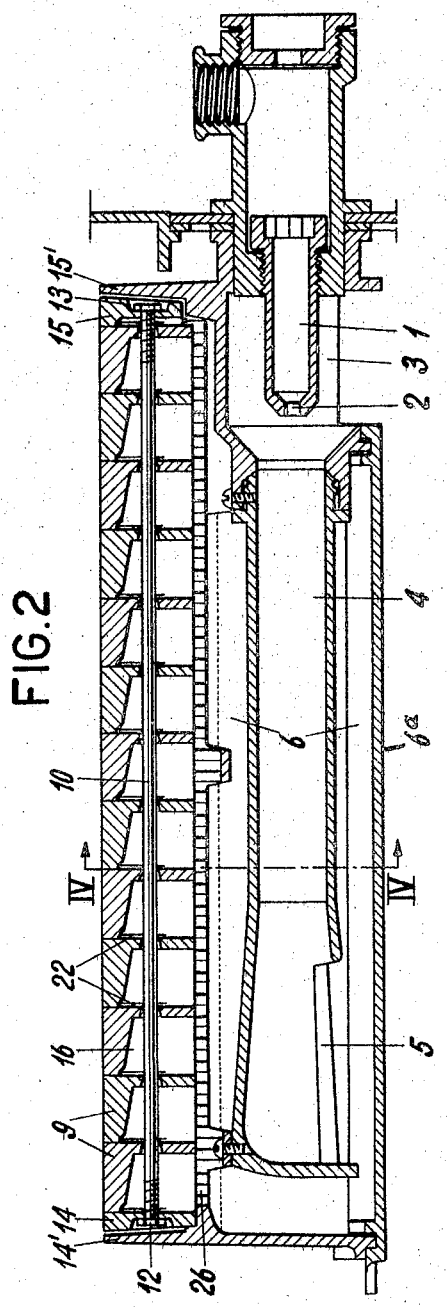

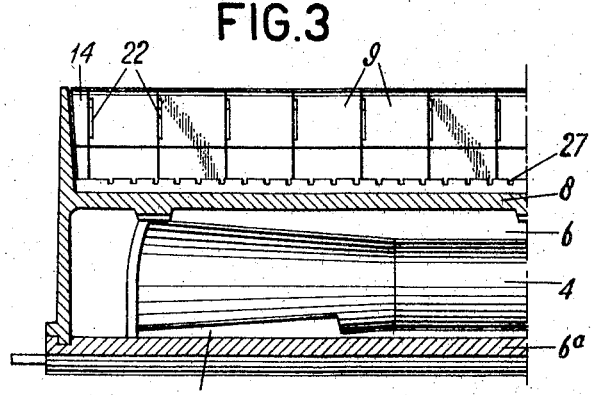
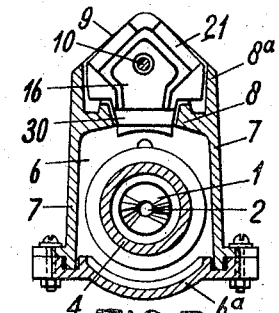
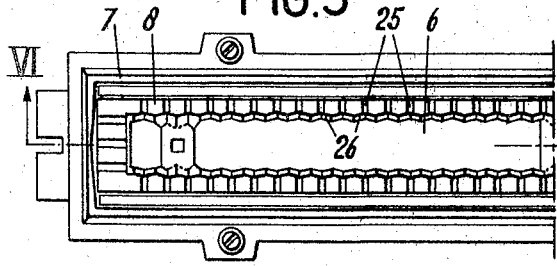
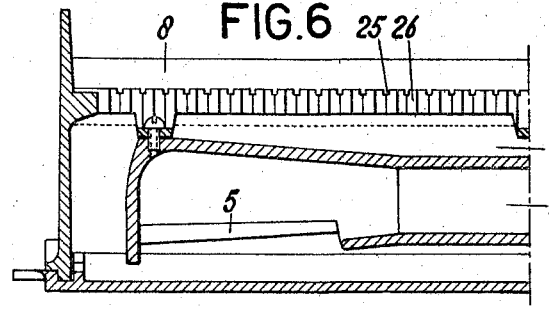
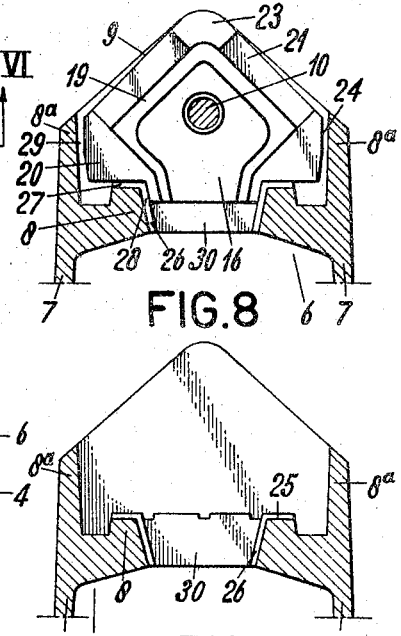
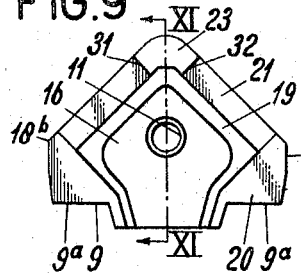
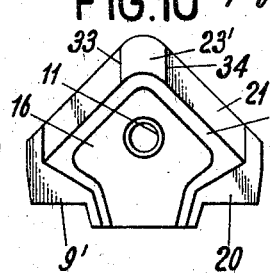
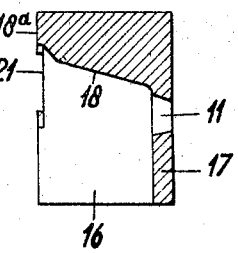

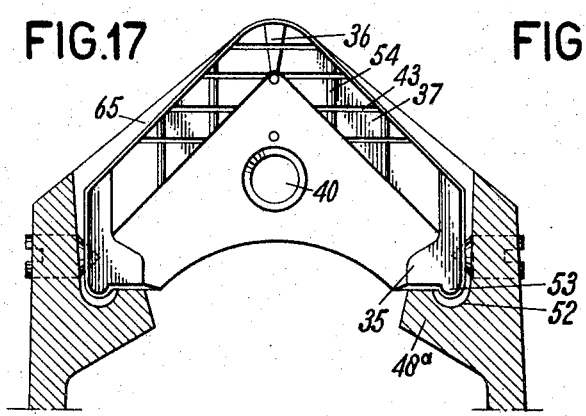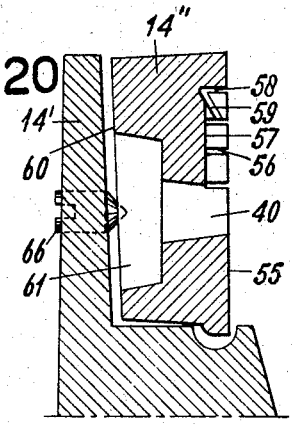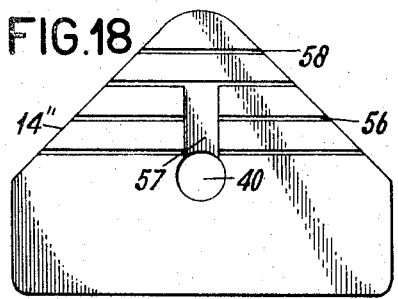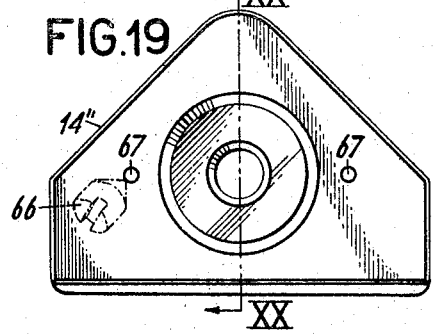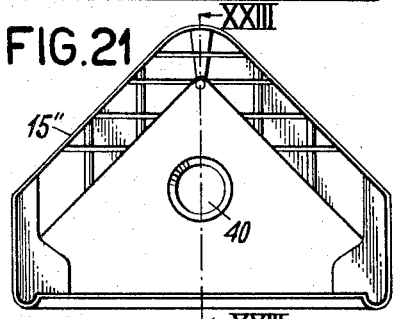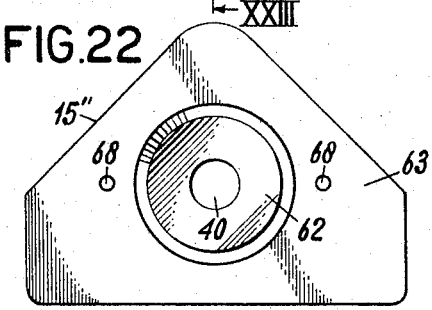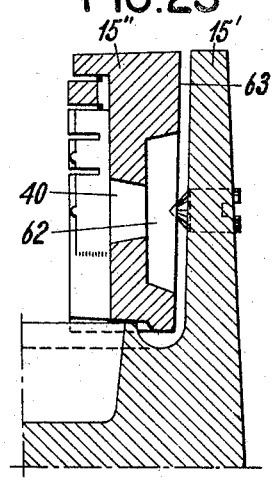

3,304,986
GAS BURNER WITH AIR AND GAS MIXING MEANS AND WITH MAIN-FLAME SLITS AND AUXILIARY SLITS FOR STABILIZING THE MAIN FLAME
Oebele Zwaagstra, Dr. van de Zandestraat 16, and Arend Jan Rompelman, Lasondersingel 40, both of Enschede, Netherlands
Filed Dec. 21, 1965, Ser. No. 515,365
Claims priority, application Netherlands, Dec. 24, 1964, 64/15110; June 18, 1965, 65/07825
17 Claims. (Cl. 158—104)

The invention relates to improvements in a gas burner of the type which utilizes its flow of fuel gas to suck in the air needed for combustion, mixes the air and gas, and burns the mixture at both main and auxiliary flames.

A problem which has not heretofore been completely solved is that of adapting such a gas burner to operation with any of town gas, water gas, coke-oven gas, and natural gas, as well as with butane and propane.

Standard gas burners for town gas and coke-oven gas have been adapted for natural gas, butane and propane, by means of a so-called G.S. piece that supplies auxiliary gas to gas-cooker burners. For proper burning, the gas-air mixture needs to have its linear out-flow velocity equal to its linear rate of combustion. If the out-flow velocity is greater than the rate of combustion, the flame blows off and is extinguished. If the out-flow is slower than the combustion, the flame strikes back. By placing a constantly burning auxiliary flame at the foot of the main flame, the danger of the main flame blowing off may be averted.

It would, of course, be possible to adjust for each kind of gas the velocity usable for the burner by adjusting the gas pressure. This, however, would result in each kind of gas delivering a different number of calories per time unit, whereas it is desirable for a burner to deliver a quantity of heat which is and remains always about the same; moreover, pressure regulation also influences the height of the flame and consequently the area of the surface to be heated. This implies that a decrease of pressure decreases the velocity and, therefore, will cause a decrease of air suction.

It has now been found that all the problems mentioned above can be solved by providing burner elements of a special shape over the gas-air mixer. The invention relates to a burner operating with a gas supply sucking along air and with an auxiliary gas supply adjacent to the main flame and the invention is characterized by a series of burner elements, each having at one end on a plane perpendicular to the longitudinal direction of the gas burner recesses which cooperate with the preceding burner elements to provide slits for transmission of the main gas flow, and having also means providing the transmission of auxiliary gas. These burner elements rest upon supports provided by the side walls of the gas-air mixer. The series of burner elements is united into a single assembly by means of suitable clamping means.

In order to enable the number of calories to be changed, the burner elements are preferably clamped between two fixed end members by means of a clamping rod, so that they become an assembly which can be lifted from the burner as a unit, i.e., can be lifted from the supports and can be replaced by another assembly of burner elements.

In one embodiment of this invention, the supports can be constructed to provide upper recesses for the burner elements opening in lateral recesses in the supports, the upper recesses extending perpendicular to the longitudinal direction of the burner, whereas the lateral recesses are inclined with regard to the upper recesses and always two lateral recesses open into one upper recess, in such a way that when the burner elements are mounted, auxiliary slits are formed, whilst the burner element consists preferably in a rear wall, two side walls and an upper wall, a slit-like recess being arranged at the front of the upper part of the side wall.

The lower part of the side wall can be so arranged at its front end that it cooperates with the supports to form slits for the transmission for the auxiliary gas flow.

Manufacture requires considerable exactness for the casting of the burner elements and the burner housing, which cannot always be attained because the tolerances are small. In order to avoid these difficulties, to increase the tolerances required in casting and, consequently, to decrease the cost of casting, an extra mechanical operation which is extremely simple may be added, for which operation the tolerances are very easily attainable. To this end, slits for transmitting the auxiliary gas are formed by narrow incisions of shallow depth in the front wall and the rear wall, the slits forming a connection between the hollow interior of the burner element and its exterior faces, the exterior faces being situated in front of each slit at the height of the slit-like recesses for the main flow of gas.

Further characteristics will be mentioned in the following description of a few embodiments given with the aid of the drawing.

In the drawing:

FIG. 1 is a top plan view of a gas burner embodying the principles of the invention;

FIG. 2 is a view in cross section taken along the line II—II in FIG. 1;

FIG. 3 is a view in cross section taken along the line III—III in FIG. 1;

FIG. 4 is a view in cross section taken along the line IV—IV in FIG. 2, showing at the same time an end view of one burner element, at the end where the recesses for the main gas flame are situated;

FIG. 5 is a top plan view of one half of the device of FIG. 1 but with the burner elements removed;

FIG. 6 is a view in cross section taken along the line VI—VI in FIG. 5;

FIG. 7 is a view on an enlarged scale of the upper portion of FIG. 4, showing the burner element with a part of its support;

FIG. 8 is a view of the support portion of FIG. 7;

FIG. 9 is a view in end elevation of a burner element of FIG. 7;

FIG. 10 is a view in end elevation similar to FIG. 9 of a modified form of burner element;

FIG. 11 is a view in cross section taken along the line XI—XI in FIG. 9;

FIG. 17 is a view in end elevation of another modified form of burner element embodying the principles of the invention;

FIG. 18 is a front elevation view of a front end element lying against a front end piece;

FIG. 19 is a rear elevation view of the front end element of FIG. 18;

FIG. 20 is a vertical sectional view, taken along the line XX—XX in FIG. 19;

FIG. 21 is a front elevation view of a rear end element lying against a rear end piece;

FIG. 22 is a rear elevation view of the rear end element of FIG. 21;

FIG. 23 is a vertical sectional view taken along the line XXIII—XXIII in FIG. 22.

Figure 12:
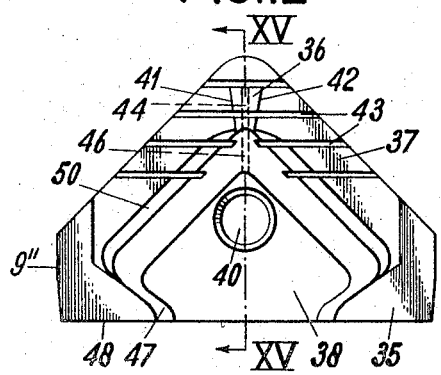
FIG. 12 is a view in end elevation of another modified form of burner element with slits for the auxiliary gas at the side where the recesses for the main gas flame are situated.
Figure 13:
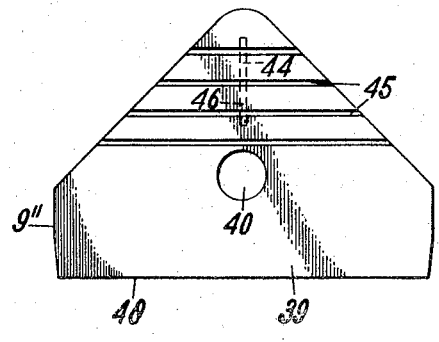
FIG. 13 is an end elevation view of the other end of the burner element of FIG. 12.
Figure 14:
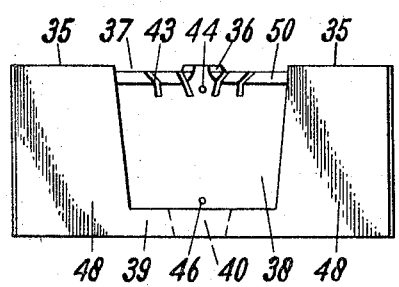
FIG. 14 is a bottom view of the burner element of FIGS. 12 and 13.

A gas burner embodying the principles of the invention is shown in FIGS. 1 to 9 and 11 and comprises a gas supply nozzle 1 of a known type (see FIG. 2). The gas flowing from a nozzle opening 2 sucks in air through an air inlet 3, and the gas and air flow together into a mixing and diffusing tube 4. Through the outlet 5 of the mixing and diffusing tube 4 the gas flows into a gas mixing space 6 defined by a bottom wall 6a and side walls 7, in which the mixture is again mixed and is completely homogenized by turbulence.

Above the gas mixing space 6, each side wall 7 (see FIG. 4) is provided with a support portion 8. A series of burner elements 9 is supported with their lower portions 9a resting on the supports 8, the front surface 18a of each burner element 9 being supported by the rear wall 17 of the preceding burner element 9. All the burner elements 9 are clamped into a unitary assembly by means of a clamping rod 10, which runs through the apertures 11 in the rear walls 17 of the burner elements 9. In order to facilitate the installation of the clamping rod 10, these apertures 11 may be tapered, as shown in FIGS. 9 and 11. The clamping rod 10 may be secured by means of nuts and sealing rings 12 and 13 (FIG. 2) in a front end element 14 and a rear end element 15. The assembly comprising the burner elements 9, the end elements 14 and 15, the clamping rod 10, and its nuts and rings 12 and 13 can easily be lifted from the burner as a unit and, of course, be re-inserted or replaced by a similar assembly.

The burner elements 9 have (see FIG. 11) a hollow interior space 16, a rear wall 17, and a tappered upper wall 18 sloping upwards to a front wall 18a and side walls 18b and 18c (see FIG. 9). These side walls 18b and 18c have upper parts 19 that slant down from the top at angle of about 45° outwards and downwards, and lower parts 20 that run inwards and downwards. At the front end of each upper part 19 there is a recess 21 which cooperates with the rear wall 17 of the preceding burner element to define a slit 22. The recess 21 and, consequently, the slit 22, extends between an unrecessed surface 23 at the top of the burner 9 and the lower end of the upper part 19.

Between the lower part 20 of the side walls 18b and 18c and extensions 8a of the supports there is a slit 24, which can be formed in various ways. The simplest way is to so dimension the support 8 and the bottom surface of the lower part 20 of the burner element 9 that a slit is formed therebetween in the way indicated in FIG. 7. Preferably, as indicated in FIGS. 5 and 6, the supports 8 have upper recesses 25 forming with the burner elements 9 slits 27 and also lateral recesses 26 forming with the burner elements 9 slits 28. The upper slit 27 continues in a slit 29 lying between the outer side of the lower part 20 of the side wall of the burner element 9, the side wall of the burner, the support 8 and the rear wall 17 of the preceding burner element.

When in operation, the main flow of gas is from the gas-mixing space 6 through an aperture 30 (FIGS. 4 and 7) between the two supports 8 into the hollow space 16 in the burner element 9, and it leaves via the slits 22. Outside the slits 22, the gas burns with a flame whose breadth equals the length of the slit 22. Each burner element 9 gives, therefore, two main flames separated by the top surface 23. This top surface 23 has two lower edges 31 and 32 enclosing an angle of about 90° (FIG. 9), by which flames are formed which emerge sideways at angles of about 45°.

FIG. 10 differs from FIG. 9 in showing side walls 33 and 34 of a modified form of upper surface 23′ of a burner element 9′, the side walls 33 and 34 being vertically parallel, causing a substantially vertical exit of flames from recesses 21′. Naturally, the top surface 23 or 23′ may also have edges which run otherwise than the edges 31, 32 or the edges 33, 34, but generally the edges 31, 32 running at an angle of 45° as in FIG. 9 are preferred.

An auxiliary gas flow passes from the gas mixing space 6 via the slits 28, 27 and 29 outwards, at about the height of and to one side of the lower part of the main slit 22. The auxiliary flame which is formed there aids in maintaining the combustion of the main flame during adverse conditions. Because its gas is supplied to this auxiliary flame through a narrow slit system, the linear velocity of the flow of gas going through is so small that there can be no question of the auxiliary flame being blown away.

In order to give an idea about preferable dimensions, dimensions are given of burner elements which, as tests have proved, yield excellent results and which have for all above-mentioned kinds of gas a much greater capacity than is customary. Burner elements 9 having a height of 42 mm., a greatest width of 53 mm., and a length of 30 mm., with a main slit 22 (recess 21) having a length of 30 mm. and a width of 1 to 1.2 mm. (the wall thickness is at that place 6 mm.), with a top surface 23 having a greatest width of 11.5 mm. and a lower aperture of about 20 mm. yield about 20 kcal./mm.$^2$ of the main slit 22. Each burner element, therefore, yields $$2 \times 30 \times 1.2 \times 20 = 1440 \text{ kcal.}$$

Figure 15:
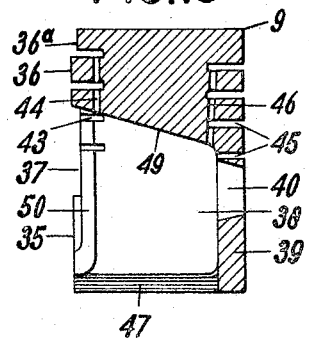
FIG. 15 is a view in cross section taken along the line XV—XV of FIG. 12.
Figure 16:
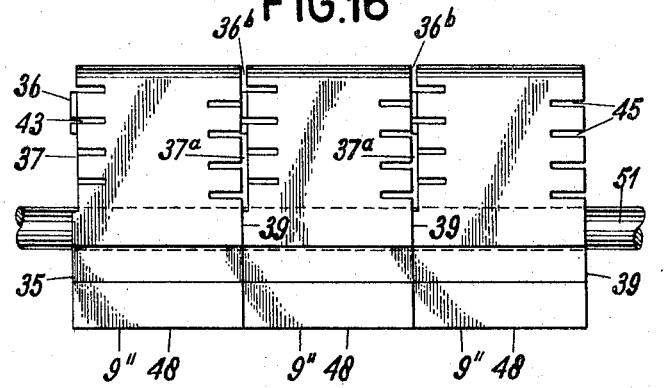
FIG. 16 is a view in side elevation of three burner elements of FIGS. 12 to 15, positioned one against the other upon the support.

In the burner elements shown in FIGS. 12 to 16 the lower portions rest with flat lower walls 48 upon suitable supports (not shown) and with their front surfaces against the rear wall 39 of the preceding burner element, as shown in FIG. 16.

The burner elements are clamped together to form a single assembly by means of a clamping rod 51 which runs through all apertures 40 in the rear walls 39 of the burner elements 9″, the assembly being secured to a front end element 14 and a rear end element 15 (as in FIGS. 1 and 2); the assembly of burner elements, end elements and clamping rod may be easily removed from and inserted into the burner.

The burner elements 9″ of this embodiment have a hollow interior space 38, a rear wall 39, a tapered forwardly advancing wall 49, a recessed front wall 37 which may show at the front a rounding or bending 50, and side walls. The side walls run down from the top, slanting at an angle of about 45° outwards and downwards, and subsequently run inwards and downwards at a lower part 35, where they can end in a curved portion 47. At the front of the part of the side wall which runs at an angle of 45° outwards and downwards, there is the recess wall 37 which, together with the rear wall 39 of the preceding element, forms a slit 37a (FIG. 16). This recess 37 and, therefore, the slit 37a continues at the upper side onto a top surface 36 and at the lower side onto the lower part 35.

The lower part 35 rests with its lower surface 48 upon the upper surfaces of flat supports. It is also possible to provide the inner side of each lower surface of the lower part 35 with a collar locking across the inner sides of the supports; of course this collar can be quite short (not shown in the drawings).

The top surface 36 of the burner element is bounded by two side walls 41 and 42, preferably enclosing an angle of 10–30°. When in operation, the main gas flow from the gas mixing space 6 comes through the aperture 30 to the hollow space 38 in the burner element 9″ and leaves through the two slits 37a formed by the recesses 37 and the rear wall 39 of the preceding and adjacent element. Outside these slits 37a, the gas burns with two main flames having the width of the slits, the main flames being separated by the top surface 36. The main flames emerge laterally at an angle of about 85° relative to the horizontal surface.

The burner elements may be constructed by casting. Subsequently the following items are mechanically arranged therein:

(1) A number of sawed-in, preferably horizontal slits 43, cut into the recesses 37 above the aperture 40 in the rear wall 39, preferably equally interspaced onto the upper ends of the side edges 41 and 42 of the top surface 36 and, therefore, also cut into the top surface 36 itself;

(2) A number of sawed-in, preferably horizontal, slits 45 which cut into the rear wall 39 above the aperture 40; the slits 45 cut into the thinnest part of the rear wall 39 may go completely through into the hollow space 38; the slits 45 are preferably equally interspaced at about the same locations as the slits 43 at the front of the burner element, but preferably staggered with respect thereto;

(3) At least one, chiefly vertical, inner bore 44, continuing onto the uppermost slit 43 and thus connecting those slits 43 which intersect the top surface 36 with the hollow space 38; it will be clear that if no slits 43 intersect the top surface 36, this inner bore 44 will be superfluous;

(4) A chiefly vertical inner bore 46, running from the hollow space 38 near the rear wall 39 onto the uppermost slit 45.

As shown in FIG. 16, the slits 43 and 45 have been arranged in such a manner that they are staggered with regard to each other. In the assembly of FIG. 16 the auxiliary flames are formed chiefly at the ends facing the recesses 37. The staggered position of the slits 43 and 45 with regard to each other causes a double number of small flames, which each cover a small circle at the sides of the burner element, these circlets touching each other, so that the main flame is kept burning along its entire breadth (which equals the breadth of the slit formed by the recess 37). In order to prevent the blowing-off of the auxiliary gas flames, the slits 43 and 45 are narrow and shallow, so that the velocity of the auxiliary gas flow through these slits is very low.

The action of the auxiliary gas flames is most favourably augmented by letting the upper part of the top surface 36 recede at 36a (see FIG. 15). By this a narrow slit 36b is formed also at the upper side which is, via the uppermost slit 43 and the vertical inner bore 44 in connection with the hollow space 38. The auxiliary flame forward outside this top surface slit 36b serves as an overlapping safety flame, which averts the danger of blowing-off at the top, e.g. with natural gas.

Favourable dimensions of these burner elements 9″ are, for example, height 37–42 mm., largest width 53 mm., length 25–30 mm. The recess 37 is, measured along the side wall under an angle of 45°, about 30 mm. in length and has a depth of 1 to 1.2 mm., whilst the wall-thickness is at that place 6 mm. The top surface 36 has a largest width of about 3 mm. with a top angle of 20°. The recessed part 36a laying above the uppermost slit 43 of the top surface 36 has a depth of about 0.7 mm. The depth of the slits 43 and 45 is 3 to 5 mm., the width ½ mm., whilst the spaces between the slits are about 5 mm. The inner bores have a diameter of about 1½ mm.

The burner element 65 shown in FIG. 17 differs on two points as compared with that shown in the FIGS. 12 to 16. The supports 48a, upon which this burner element 65 rests, are provided with grooves 52 running longitudinally, the lower part 35 of the burner element 65 bearing corresponding collars 53. Each collar 53 rests in a groove 52 and can therein, if so desired, be sealed with, e.g., an asbestos fibre packing in order to prevent leakage of gas. In the second place, one or more ribs 54 have been arranged on the surfaces of the recesses 37, the front of these ribs 54 lying in the same plane as the front surfaces of the lower part 35 and the top surface 36. These ribs 54 are intersected by the slits 43. If the burner elements 68, united in a single assembly, are placed upon the supports 48a, vertical channels occur at the slits 37 which are bounded by the ribs 54. The purpose of these ribs 54 is to direct the main gas flames in a more vertical direction, so that they do not fan out too much sideways. It will be clear that each of these two variants (the collar-and-groove construction and the rib-construction) may be applied each separately or in combination to the already described burner elements.

It will be clear that these burner elements will have to have a slightly different construction at both ends where they rest against the front end piece 14 and the rear end piece 15.

In FIGS. 18 to 20 an embodiment of a front end element 14″ is shown. In the rear surface 55, lying at the side turned away from the end piece 14′ there is an aperture 40 for the clamping rod 10 or 51, as well as a narrow recess 57, into which lower slits 56 open. The uppermost slit 58 (or slits) is in communication with the recess 57 via an inner bore 59, which must be arranged here in an inclined direction. The front surface 60 facing the front end piece 14′ has a recess 61 for accommodating the nut and sealing ring 12 of the clamping rod 10 or 51.

FIGS. 21 to 23 show an embodiment of a rear end element 15″. There is an aperture 40 for the clamping rod 10 or 51 in the front surface, which lies at the side facing away from the end piece 15′. This front surface is, otherwise, the same as that of the burner element shown in FIG. 17, whilst the rear surface 63 has a recess 62 for accommodating the nut and sealing ring 13 of the clamping rod 10 or 51.

Element blocks (18 pieces) are fixed in the burner housing 6a by means of six cone points 66 (clamping screws) that screw in each front and rear end piece 14′ and 15′. When screwed into the center points 67, 68 of front- and rear-end elements 14″ and 15″, they compress the element block upon supports 8 or 48a. In the center of the burner housing 6a at thickened places two clamping screws have also been arranged (not shown in the drawings).

The construction of the burner elements described by the aid of FIGS. 12 to 23 is simpler than that according to FIGS. 1 to 11, whereas the obtained results are equivalent. For that purpose a piece, which can be easily cast, can be finished by sawing or cutting the slits, and by boring the inner bores. If desired, the burner elements may be chromium-plated.

To those skilled in the art to which this invention relates many changes in construction and widely differing embodiments and applications of the invention will suggest themselves without departing from the spirit and scope of the invention. The disclosures and the description herein are purely illustrative and are not intended to be in any sense limiting.

What we claim is:

1. A gas burner comprising a unitary assembly of a series of burner elements located along a longitudinal axis and each having at one end a front wall and at the other end a rear wall, each said wall being generally perpendicular to said longitudinal axis each said front wall having angularly disposed slit-like recesses cooperating with said rear wall of an adjacent said element to provide burner slits for transmitting the main gas-air flow of said burner, said burner elements also having means defining at least in part conduit means for transmitting an auxiliary gas-air flow to provide an igniting flame adjacent to the main gas-air flow, and means for clamping said burner elements into a single assembly.

2. The burner element of claim 1, wherein each said burner element comprises said rear wall, two side walls, an upper wall, and said front wall, enclosing a hollow interior space, said means for transmitting the auxiliary gas-air flow being slits formed by narrow incisions in said front and rear walls, some of said slits forming a connection between the hollow space in said burner element and its exterior, at the height of the slit-like recesses in said front wall.

3. The burner of claim 2 wherein the auxiliary gas-air transmitting slits are arranged at mutually equal distances.

4. The burner of claim 2 wherein through the wall of said burner element, inner bores are provided connecting the said hollow space with others of said slits.

5. The burner of claim 4 wherein the inner bores run chiefly in a vertical direction and have a diameter of about 1½ mm.

6. The burner of claim 4 wherein the part of the top surface lying above said slits is slightly recessed to form a narrow top slit with the immediately adjacent burner element.

7. The burner of claim 6, wherein the receding part of the upper part of the top surface has a depth of about 0.7 mm.

8. The burner of claim 2 wherein the slits for auxiliary air and gas extend horizontally.

9. The burner of claim 2 wherein the slits in the front wall and those in the rear wall are staggered relatively to each other.

10. The burner of claim 2 wherein the slit-like recesses for the main gas flow are bounded at the upper side by side edges of a top surface of said front wall dividing said recesses and having a top angle of about 10 to 30°, said side edges converging from below to above.

11. The burner of claim 2, wherein the slits for auxiliary flow have a depth of about 3 to 5 mm. and a width of about ½ mm., whilst their mutual distance is about 5 mm.

12. The burner of claim 2 wherein the recesses in the burner element are provided with one or more ribs, the front face of which lies in the same plane as the front surface of the lower part of said front wall.

13. The burner of claim 12 wherein the ribs run chiefly in a vertical direction.

14. The burner of claim 1 wherein said rear walls are perforated and said clamping means comprise a clamping rod extending through the perforations, nuts and sealing rings at each end, the foremost burner element having a recess for receiving one said nut and sealing ring for said clamping rod and wherein the rearmost burner element has in its rear surface a recess for receiving the other said nut and sealing ring for said clamping rod.

15. A device as defined in claim 1 further including a housing providing a front end piece, a rear end piece, a longitudinally extending gas-air mixing chamber below and between said end pieces and means supporting the burner assembly over the mixing chamber.

16. A device as defined in claim 15 wherein the supporting means comprises spaced horizontal longitudinally extending flanges and recesses in the flanges communicating the mixing chamber with the conduit means.

17. A device as defined in claim 16 further including a horizontally extending groove in each flange and a projection on the lower portion of each burner element extending into the groove.

References Cited by the Examiner

UNITED STATES PATENTS

| | | | |
|---|---|---|---|
| 1,642,426 | 9/1927 | Risinger. | |
| 1,729,149 | 9/1929 | Brown et al. | 158—116 |
| 2,100,995 | 11/1937 | Le Compte | 239—552 |
| 2,228,114 | 1/1941 | Hess | 158—104 X |
| 2,573,144 | 10/1951 | Jaye | 239—568 X |
| 2,788,848 | 4/1957 | Furczyk | 239—568 X |

JAMES W. WESTHAVER, *Primary Examiner.*